United States Patent
Oh et al.

(10) Patent No.: US 10,847,067 B2
(45) Date of Patent: Nov. 24, 2020

(54) DISPLAY DEVICE AND CONTROL METHOD THEREOF

(71) Applicant: LG ELECTRONICS INC., Seoul (KR)

(72) Inventors: Joohyeon Oh, Seoul (KR); Jayoen Kim, Seoul (KR); Woojin Suh, Seoul (KR); Sangin Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/464,245

(22) PCT Filed: Nov. 30, 2016

(86) PCT No.: PCT/KR2016/013973
§ 371 (c)(1),
(2) Date: May 24, 2019

(87) PCT Pub. No.: WO2018/101507
PCT Pub. Date: Jun. 7, 2018

(65) Prior Publication Data
US 2019/0272777 A1    Sep. 5, 2019

(51) Int. Cl.
*G09F 11/02* (2006.01)
*G06F 3/14* (2006.01)
(Continued)

(52) U.S. Cl.
CPC .......... *G09F 11/025* (2013.01); *G06F 3/1446* (2013.01); *G09F 9/33* (2013.01);
(Continued)

(58) Field of Classification Search
CPC ........ G09F 11/025; G09F 9/33; G09F 19/226;
G09F 27/005; G09F 11/10; G09F 11/06;
G09F 9/3026; G09G 5/38; G09G
2354/00; G09G 2340/0492; G09G
2340/0464; G09G 2320/10; G09G
2300/026; G09G 5/00; G09G 2300/023;
G09G 2356/00;
(Continued)

(56) References Cited

U.S. PATENT DOCUMENTS

2004/0107613 A1* 6/2004 Park ........................ G09F 11/29
40/515
2007/0159413 A1    7/2007 Thorjussen et al.
(Continued)

FOREIGN PATENT DOCUMENTS

KR    20120130457    12/2012

OTHER PUBLICATIONS

PCT International Application No. PCT/KR2016/013973, International Search Report dated Jul. 24, 2017, 2 pages.

*Primary Examiner* — Sae Won Yoon
(74) *Attorney, Agent, or Firm* — Lee, Hong, Degerman, Kang & Waimey

(57) ABSTRACT

A display device includes a plurality of display modules provided to output visual information, having a bar shape, and sequentially disposed in one direction, a connection unit connecting the plurality of display modules such that the plurality of display modules are relatively moved, and a controller controlling the connection unit to relatively move the plurality of display modules to adjust daylighting using a space between the plurality of display modules.

15 Claims, 19 Drawing Sheets

(51) Int. Cl.
*G09F 11/06* (2006.01)
*G09F 11/10* (2006.01)
*G09G 5/38* (2006.01)
*G09F 27/00* (2006.01)
*G09F 19/22* (2006.01)
*G09F 9/33* (2006.01)
*G09F 9/302* (2006.01)

(52) U.S. Cl.
CPC .............. *G09F 11/06* (2013.01); *G09F 11/10* (2013.01); *G09F 19/226* (2013.01); *G09F 27/005* (2013.01); *G09G 5/38* (2013.01); *G09F 9/3026* (2013.01); *G09G 2300/026* (2013.01); *G09G 2320/10* (2013.01); *G09G 2340/0464* (2013.01); *G09G 2340/0492* (2013.01); *G09G 2354/00* (2013.01)

(58) Field of Classification Search
CPC ............ G09G 2360/04; G09G 2360/06; G06F 3/1446; E06B 9/386; E06B 2009/247; E06B 9/326; H02S 20/30
USPC .......................................... 345/659, 1.1, 1.3
See application file for complete search history.

(56) References Cited

U.S. PATENT DOCUMENTS

| | | |
|---|---|---|
| 2007/0175599 A1 | 8/2007 | Froese |
| 2008/0041533 A1 | 2/2008 | Ziegler |
| 2009/0120594 A1* | 5/2009 | Koster ..................... E06B 9/24 160/220 |
| 2011/0126992 A1 | 6/2011 | Yordanova |
| 2013/0100001 A1* | 4/2013 | Reeves ..................... G09G 5/12 345/1.3 |
| 2018/0065020 A1* | 3/2018 | Lee ......................... A63B 71/06 |

\* cited by examiner

DISPLAY DEVICE AND CONTROL METHOD THEREOF

CROSS-REFERENCE TO RELATED APPLICATIONS

This application is the National Stage filing under 35 U.S.C. 371 of International Application No. PCT/KR2016/013973, filed on Nov. 30, 2016, the contents of which are all hereby incorporated by reference herein in its entirety.

BACKGROUND OF THE INVENTION

1. Field of the Invention

The present disclosure relates to a display device including a plurality of display modes and a control method thereof.

2. Description of the Related Art

Recently, display devices having excellent properties such as thin, flexible displays promoting diversity in forms have been developed in a display technical field. Part of the technology development includes a display device using a light emitting diode (LED).

An LED is a well-known semiconductor light emitting device converting a current into light. The LED is an optoelectronic device having a junction structure of a P-type and N-type semiconductors, and when power is applied, electrons and holes are combined to emit light of energy corresponding to a bandgap of the semiconductors.

An LED has a faster reaction time, compared with an existing liquid crystal display, has a longer lifespan, compared with an existing active matrix organic light emitting diode (AMOLED), and has a high production yield.

However, a display device using a related art LED is formed as a square module, having a limitation in a shape of a display device that may be implemented. The present disclosure proposes a display device implemented as a linear display module in order to overcome a limitation in a shape of such a display device.

SUMMARY OF THE INVENTION

An aspect of the present disclosure provides a display device capable of providing both a daylighting effect and an advertisement effect.

Another aspect of the present disclosure proposes a display device in a new form.

Another aspect of the present disclosure proposes a method for effectively providing visual information using a display device in a new form.

According to an aspect of the present invention, there is provided a display device including: a plurality of display modules provided to output visual information, having a bar shape, and sequentially disposed in one direction; a connection unit connecting the plurality of display modules such that the plurality of display modules are relatively moved; and a controller controlling the connection unit to relatively move the plurality of display modules to adjust daylighting using a space between the plurality of display modules.

In an embodiment, the controller may control the connection unit such that the plurality of display modules have a predetermined space therebetween on the basis of a user's control command.

In an embodiment, the controller may determine a display size of the visual information on the basis of a space between the plurality of display modules.

In an embodiment, when a space between the plurality of display modules corresponds to a preset space, the controller may limit outputting of at least a portion of the visual information.

In an embodiment, when outputting of at least a portion of the visual information is limited, the controller may output the other remaining portion of the visual information on the plurality of display modules.

In an embodiment, the controller may output different types of visual information on the basis of a space between the plurality of display modules.

In an embodiment, when a space between the plurality of display modules is changed from a first space to a second space, the controller may change visual information output on the plurality of display modules from first visual information to second visual information.

In an embodiment, the controller may determine an output position of the visual information on the basis of a rotation angle at which the plurality of display modules are rotated with respect to a preset reference axis.

In an embodiment, the plurality of display modules may each have a front surface and a side surface able to output visual information, and when the plurality of display modules rotate at an angle smaller than a preset rotation angle, the controller may output the visual information on the front surface region, and when the plurality of display modules rotate at an angle greater than a preset rotation angle, the controller may output the visual information on the side surface region.

In an embodiment, the controller may set a space between the plurality of display modules on the basis of the visual information and relatively move the plurality of display modules to have the preset space therebetween.

In an embodiment, the controller may control the plurality of display modules to be relatively moved at every preset time period.

In an embodiment, the controller may output different types of visual information in response to a relative movement of the plurality of display modules at every preset time period.

According to another aspect of the present invention, there is provided a method for controlling a display device having a plurality of display modules relatively movable to each other, including: relatively moving the plurality of display modules to have a preset space therebetween; determining visual information to be output on the plurality of display modules on the basis of the preset space; and displaying the determined visual information on the plurality of display modules, wherein a display form of the visual information is determined according to the preset space.

In an embodiment, in the displaying of the visual information, the visual information may be displayed in a display form determined according to the preset space.

In the embodiment, when the preset space is changed, the visual information to be displayed on the plurality of display modules may be changed in a display form so as to be displayed.

In an embodiment, the preset space may be set according to a user's control command or a preset condition.

In an embodiment, a display form of the visual information may include at least one of a display size and a display position of the visual information.

According to another aspect of the present invention, there is provided a method for controlling a display device having a plurality of display modules relatively movable to each other, including: setting visual information to be displayed on the plurality of display modules; and relatively moving the plurality of display modules to have a space therebetween corresponding to the set visual information, wherein a space between the plurality of display modules is determined according to an attribute of the visual information.

In an embodiment, the attribute of the visual information may be at least one of a type and resolution information of the visual information.

In an embodiment, in the relatively moving of the plurality of display modules, when visual information to be displayed on the plurality of display modules is changed from first visual information to second visual information, the plurality of display modules may be relatively moved to have a second space from a first space.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
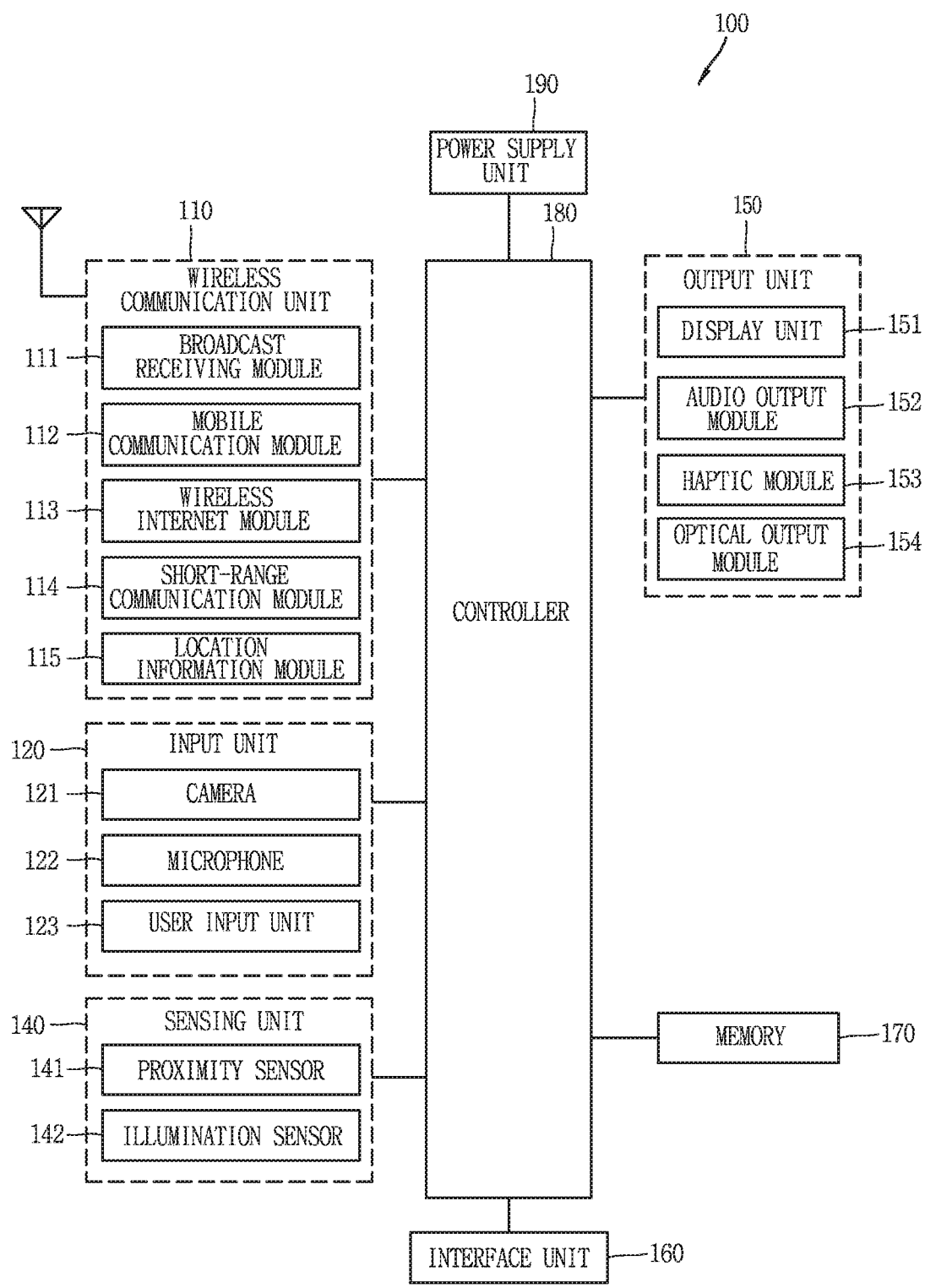
FIG. 1 is a block diagram illustrating a display device related to the present disclosure.

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings. In the following description, explanations will be made in order in the clockwise direction based on the drawing in a right upper side.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

A display device described in this disclosure is a device for outputting visual information and includes a fixed terminal and a mobile terminal.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

FIG. 1 is a block diagram illustrating a display device related to the present disclosure.

The display device 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In detail, the wireless communication unit 110 typically includes one or more modules which permit communications such as wireless communications between the display device 100 and a wireless communication system, communications between the display device 100 and another mobile terminal, communications between the display device 100 and an external server. Further, the wireless communication unit 110 typically includes one or more modules which connect the display device 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The display device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the display device 100 and a user, as well as function as the user input unit 123 which provides an input interface between the display device 100 and the user.

The interface unit 160 serves as an interface with various types of external devices that can be coupled to the display device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the display device 100 may perform assorted control functions associated with a connected external device, in response to the external device being connected to the interface unit 160.

The memory 170 is typically implemented to store data to support various functions or features of the display device 100. For instance, the memory 170 may be configured to store application programs executed in the display device 100, data or instructions for operations of the display device 100, and the like. Some of these application programs may be downloaded from an external server via wireless communication. Other application programs may be installed within the display device 100 at time of manufacturing or shipping, which is typically the case for basic functions of the display device 100 (for example, receiving a call, placing a call, receiving a message, sending a message, and the like).

It is common for application programs to be stored in the memory 170, installed in the display device 100, and executed by the controller 180 to perform an operation (or function) for the display device 100.

The controller 180 typically functions to control overall operation of the display device 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the display device 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Figure 2:
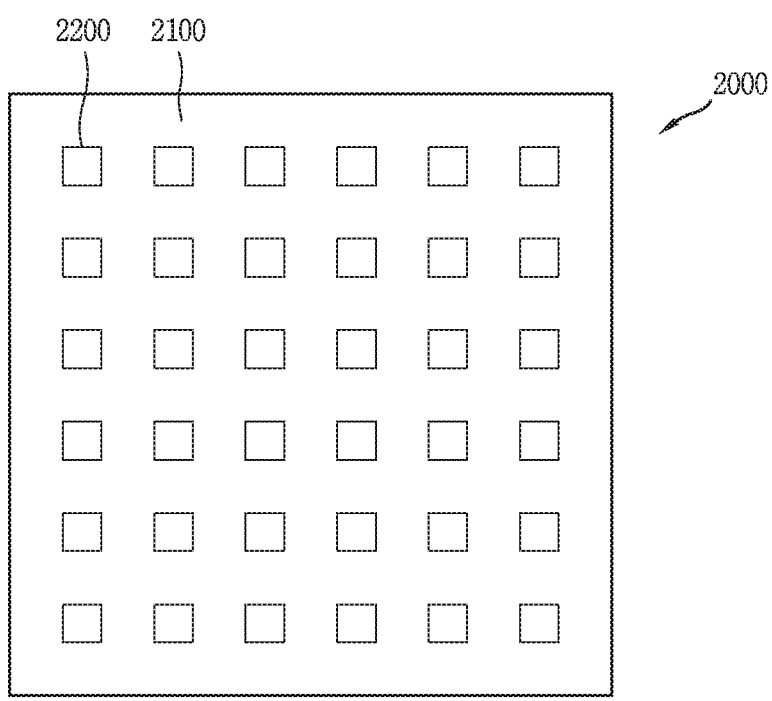
FIG. 2 is a conceptual view illustrating a display module forming a related art display device in the related art display device.
Figure 3A:
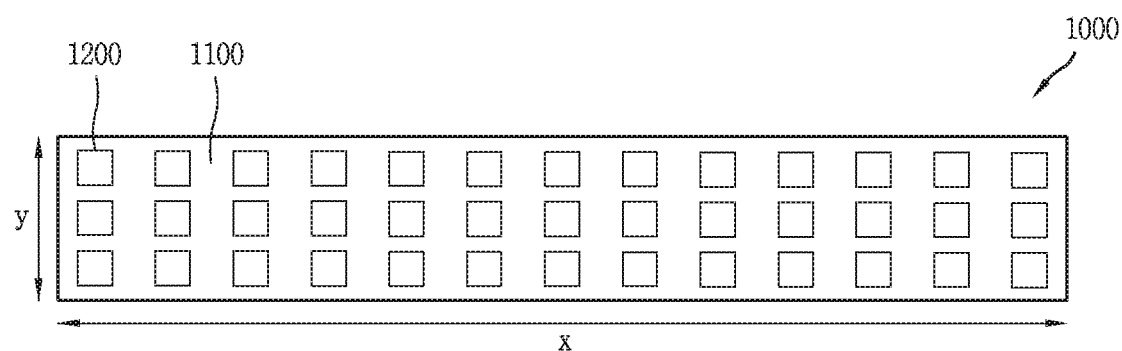
FIGS. 3A and 3B are conceptual views illustrating a display module of a display device according to the present disclosure.
Figure 3B:
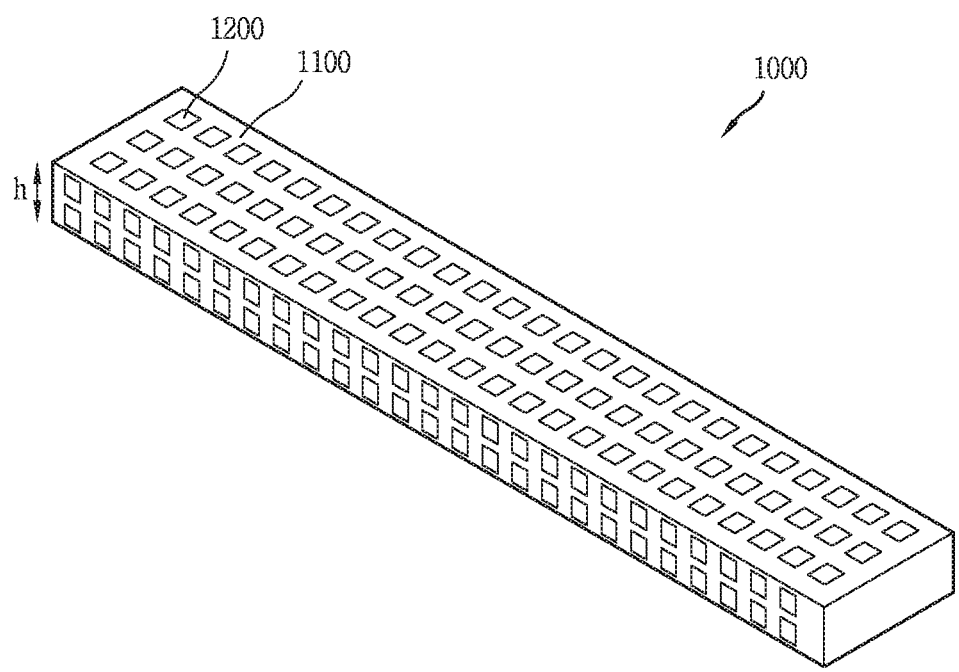

Hereinafter, a display module forming a display device 100 including at least some of the components of FIG. 1 will be described. FIG. 2 is a conceptual view illustrating a display module of the related art display device 100, and FIGS. 3A and 3B are conceptual views illustrating a display module of the display device 100 according to the present disclosure.

The display device 100 according to the present disclosure may include a plurality of display modules.

A display module refers to a component forming the display unit 151 of the display device 100. That is, in the display device 100, a plurality of display modules may be electrically combined to form a single display unit 151.

The display module may include a main body, a PCB coupled to the main body, a plurality of LED devices attached to the PCB and operating as light emitting devices, and a connection unit transmitting an electrical signal and power to the plurality of LED devices. Also, the display module may further include a heat dissipating member for smoothly dissipating heat generated by the LEDs outwardly.

The main body may accommodate the PCB and may be formed of a material such as aluminum, or the like.

The PCB accommodates the plurality of LED devices and may serve to supply power to the plurality of LED devices or transmit a signal.

In the plurality of LED devices, three LED devices of red (R), green (G), and blue (B) form a single pixel and may be disposed on the PCB 2100.

The plurality of LED devices 2200 may be connected in series or in parallel, and preferably, the plurality of LED devices 2200 may be connected in parallel to each other such that there is no influence according to forward voltage drop.

Meanwhile, in the related art, as illustrated in FIG. 2, the PCB 2100 having a square shape has been commonly used as the display module 2000. For example, as the related art display module, a display module having a size of 150 mm×150 mm or 320 mm×320 mm in width and length is commonly used. In the PCB 2100, a plurality of LED devices 2200 are disposed at equal spaces.

However, in the related art display module 2000 having the square shape, since the shape of the display module 2000 is limited to the square shape or a rectangular shape, it may be difficult for display modules to be combined with each other, and a single display device formed by coupling display modules has a limitation in shape.

In order to solve the problem, in the present disclosure, as illustrated in FIG. 3A, a bar-shaped display module 1000 may be used.

Referring to FIG. 3A, the display module 1000 according to the present disclosure may have a bar shape, unlike that of FIG. 2. The bar shape, as a shape formed to extend in one direction, may refer to a shape in which a length is longer than a width.

As illustrated in FIG. 3A, the display module 1000 may include a PCB 1100 extending in one direction and a plurality of LED devices 1200 disposed on one surface of the PCB 1100.

The PCB 1100 may have a rectangular shape extending in one direction. For example, as illustrated in FIG. 3A, the PCB 1100 may be 600 mm×37.5 mm in length (x) and width (y). Also, as illustrated in FIG. 3B, the PCB 1100 may have a thickness (h) of 10 mm. That is, since the display module 1100 according to the present disclosure has a bar shape which extends traversely, assembling of display modules is facilitated, and in the event of a fault, a display module may be easily replaced.

The plurality of LED devices 1200 may be disposed and spaced apart from each other in a length direction on one surface of the PCB 1100. For example, as illustrated in FIG. 3, the plurality of LED devices 1200 may be spaced apart from each other and disposed in one direction.

Also, the plurality of LED devices 1200 may be disposed in one or more rows. For example, as illustrated in FIG. 3A, the plurality of LED devices 1200 may be disposed in three rows. Meanwhile, FIG. 3 illustrates an example in which a plurality of LED devices 1200 are disposed, and in the present disclosure, LED devices may be disposed by the number different from that of FIG. 3, for example, 16 LED devices may be disposed in three rows or 20 LEDs may be disposed in four rows. The number of the plurality of LED devices 1200 may be set by a supplier of a display device.

Meanwhile, the plurality of LED devices 1200 may be disposed on at least one of a front surface, a side surface, and a rear surface of the PCB 1100. For example, as illustrated in FIG. 3A, the plurality of LED devices 1200 may be disposed on the front surface of the PCB 1100. In another example, as illustrated in FIG. 3B, the plurality of LED devices 1200 may be disposed on the front surface of the PCB 1100 and on the side surface extending from the front surface of the PCB. Thus, the display module according to the present disclosure may output visual information from at least two or more planes.

In the above, the display module forming a display unit in the display device 100 according to the present disclosure has been described.

Figure 4:
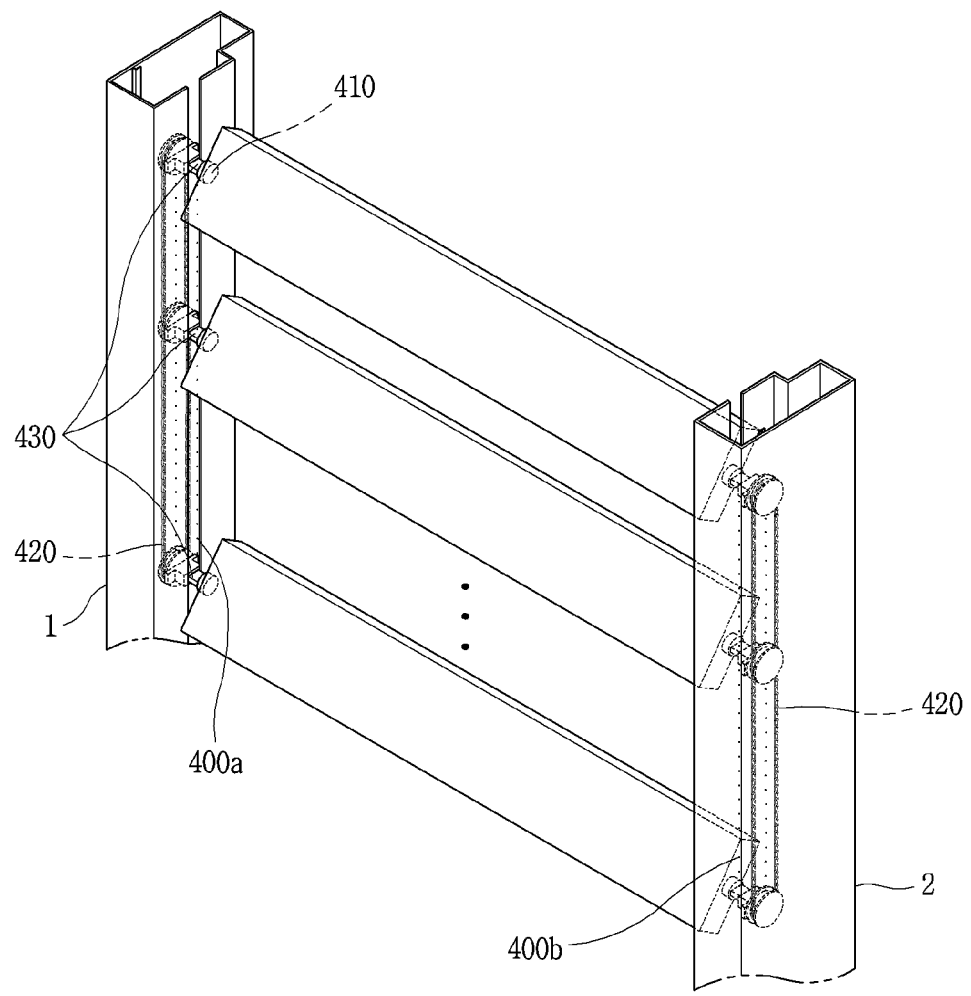
FIG. 4 is a conceptual view illustrating a display unit of a display device according to the present disclosure.

Hereinafter, the display unit 151 of the display device 100 according to the present disclosure will be described. FIG. 4 is a conceptual view illustrating a display unit of a display device according to the present disclosure.

In the display device 100 according to the present disclosure, a plurality of bar-shaped display modules are sequentially disposed in one direction to form a single display unit 151.

Also, the plurality of display modules may be electrically connected to each other. Thus, the controller 180 may transmit an electrical signal to the plurality of display modules or may receive an electrical signal from the plurality of display modules.

Also, as the plurality of display modules are relatively moved to each other, spaces between the plurality of display modules may be adjusted. For example, the plurality of display modules may rotatably move at a predetermined space in one direction. Thus, spaces between the plurality of display modules may be widened or narrowed to allow light to pass therethrough for daylighting.

For a rotational movement of the plurality of display modules, as illustrated in FIG. 4, the display device 100 according to the present disclosure may include a connection unit connecting the plurality of display modules such that the plurality of display modules are moved relatively to each other.

In detail, the connection unit may include a pair of link mechanisms 400a and 400b, a support mechanism 410 in which one end portion is connected to one link mechanism 400a and the other end portion is connected to the other link mechanism 400b to support the plurality of display modules, a lifting mechanism 420 lifting and/or lowering the plurality of display modules, and a rotating mechanism 430 causing a change in relative position of the pair of link mechanisms 400a and 400b according to lifting and/or lowering of the plurality of display modules to rotatably move the plurality of display modules.

The link mechanisms 400a and 400b may electrically and physically connect the display modules. For example, the link mechanisms 400a and 400b may include a belt type body and a shaft member to which the support mechanism 410 is rotatably connected.

The support mechanism 410 may be formed to support the display modules. For example, the support mechanism 410 may include a support member supporting the display modules, shaft holes in which the shaft members of the link mechanisms 400a and 400b are rotatably inserted, and coupling protrusions protruding and coupled to the plurality of display modules, respectively.

The lifting mechanism 420 may be coupled to the support mechanism 410 to relatively move the support mechanism 400 to thereby relatively move the plurality of display modules. For example, the lifting mechanism 420 may include a rail for performing a vertical movement, a driving device for moving the rail, and a stopper restraining driving of the rail.

Also, the rotating mechanism 430 may be configured as a motor for rotatably moving the plurality of display modules. The rotating mechanism 420 may rotate the display modules using rotary power based on a vertical movement of the lifting mechanism 410.

Also, the display device according to the present disclosure may further include frames 1 and 2. The frames 1 and 2 may serve to fix the plurality of display modules.

Also, the frames 1 and 2 may have a guide recess to allow the plurality of display modules to move in one direction. The plurality of modules may relatively move to each other in a direction of the guide recess.

In the above, the embodiment of the connection unit allowing the display device 100 to relatively move to each other has been described. Meanwhile, the present disclosure may also be implemented by various structures formed to adjust a space between the plurality of modules.

Figure 5A:
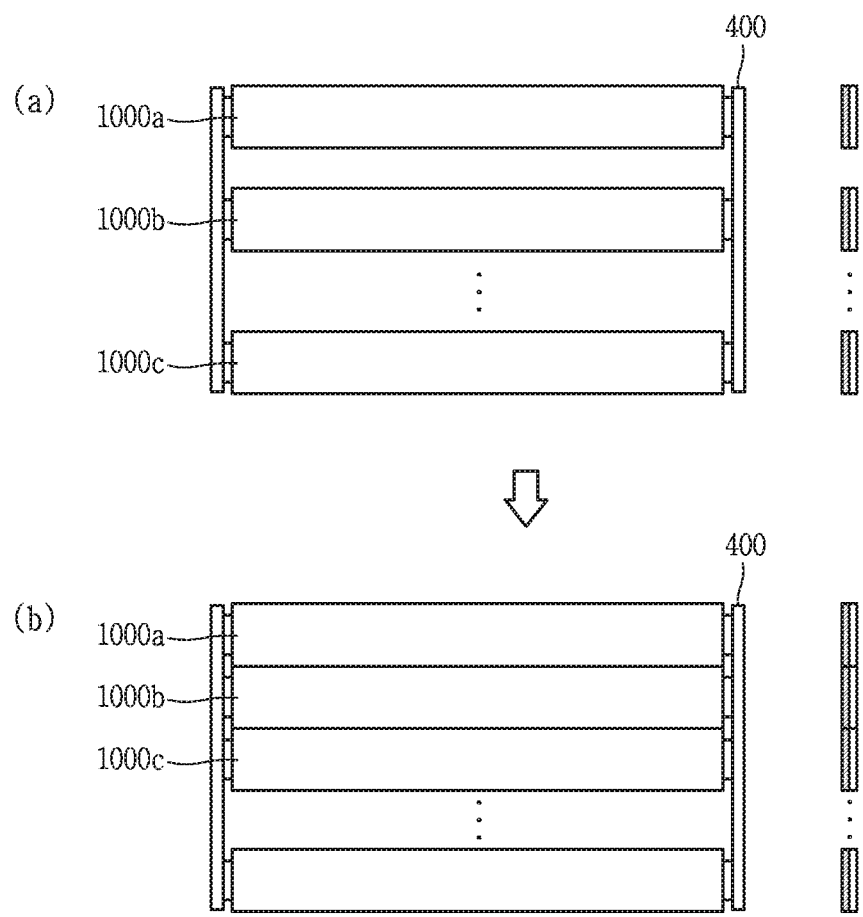
FIGS. 5A to 5C are conceptual views illustrating relative movement between a plurality of display modules.
Figure 5B:
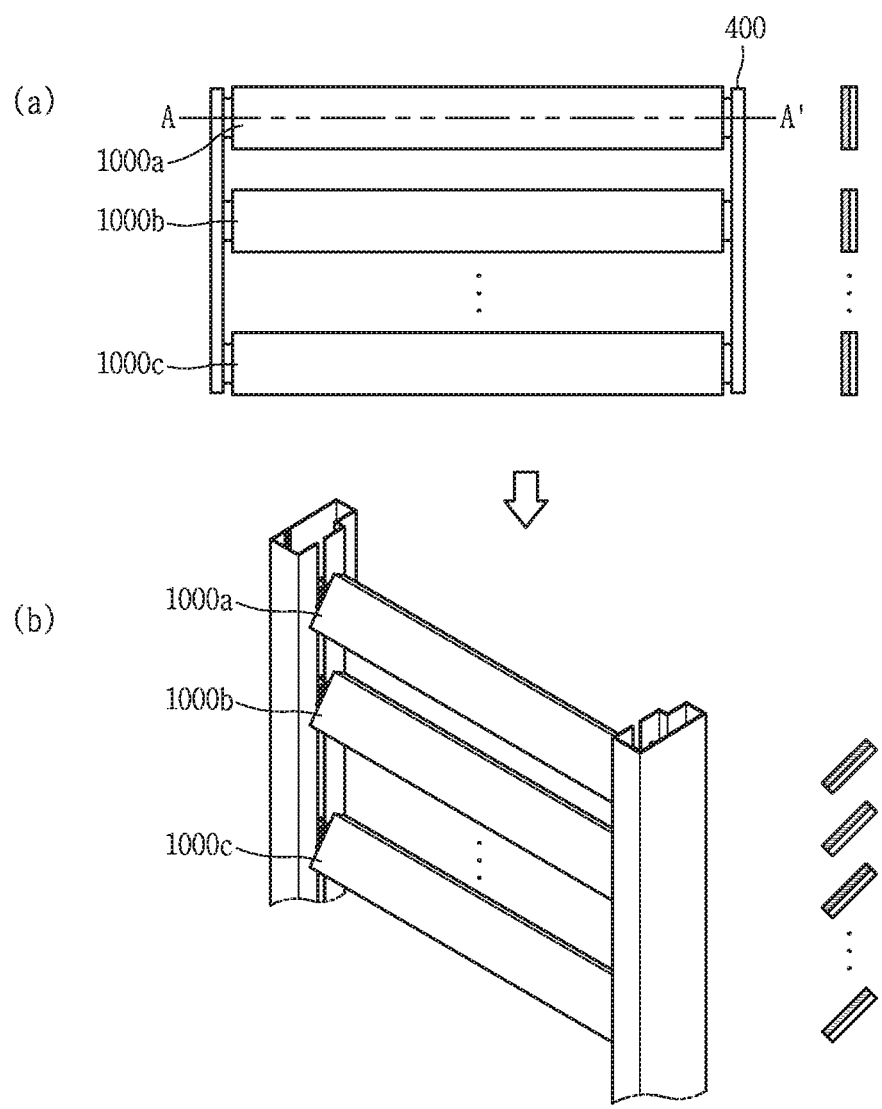
Figure 5C:
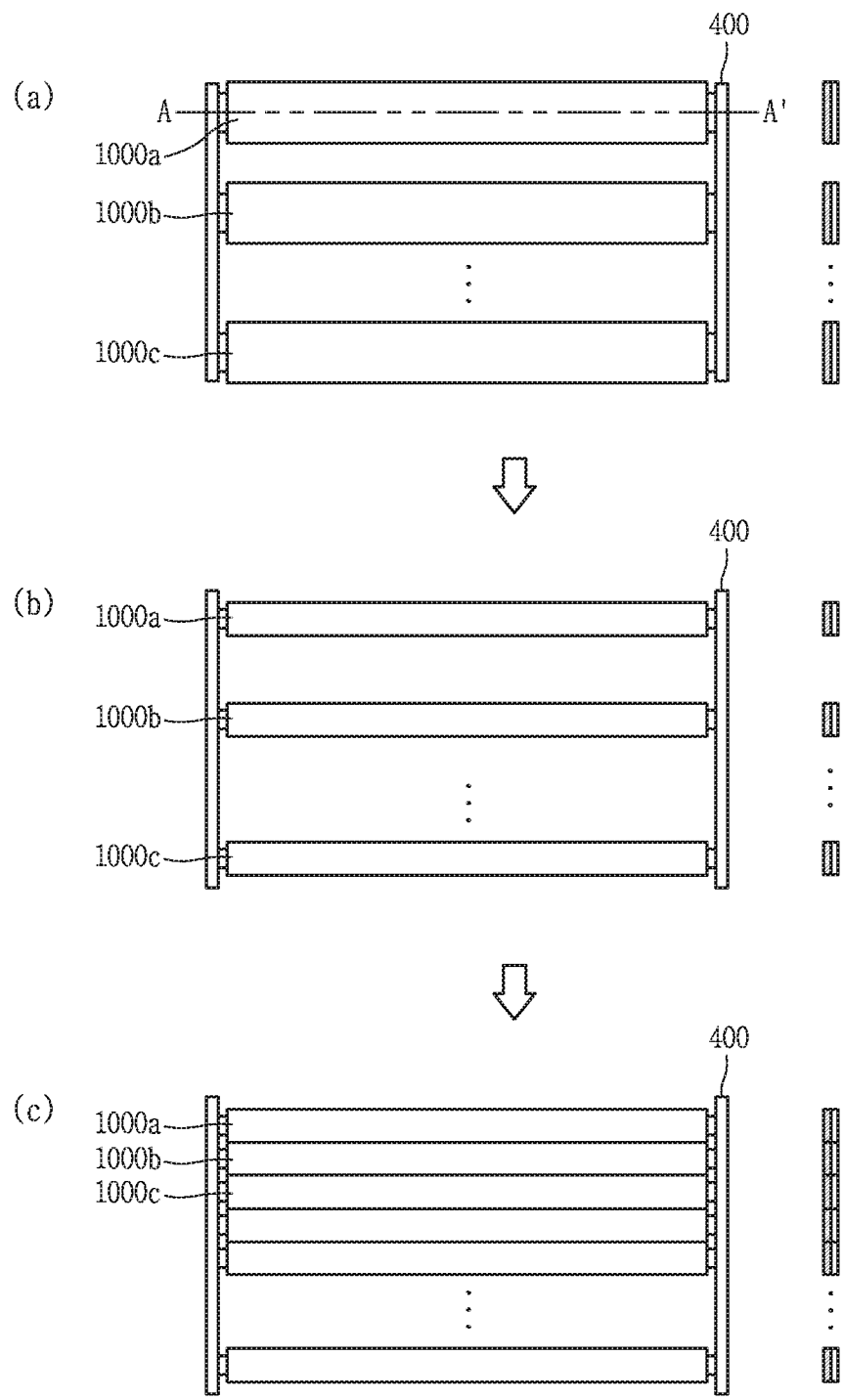

Hereinafter, a configuration in which the plurality of display modules formed according to the structure of the connection unit relatively move will be described. FIGS. 5A to 5C are conceptual views illustrating relative movement between a plurality of display modules.

In the display device 100 according to the present disclosure, the plurality of display modules forming the display unit 151 may relatively move each other through the connection unit.

In the display device 100 according to the present disclosure, a state of the plurality of display modules may be defined according to at least one condition among spaces between the plurality of display modules and a position at which visual information is displayed.

In detail, the plurality of display modules of the display device may be differentiated to a state in which a predetermined space is formed between the display modules to allow light to pass therethrough and a state in which a space is not formed between the display modules to prevent light from passing therethrough.

Also, the display device 100 may have different states depending on a position where visual information is displayed among the front surface and the side surface of the plurality of display modules.

First, a case in which visual information is displayed on the front surface of the plurality of display modules will be described. As illustrated in (a) of FIG. 5A, display modules 1000a, 1000b, and 1000c may be disposed to be spaced apart from each other at a predetermined space therebetween.

Also, the display modules 1000a, 1000b, and 1000c may be relatively moved at a predetermined angle. For example, as illustrated in (a) and (b) of FIG. 5B, the controller 180 may relatively move the plurality of display modules 1000a, 1000b, and 1000c at a predetermined angle with respect to a rotational axis A-A' in a direction perpendicular to a direction in which the plurality of display modules 1000a, 1000b, and 1000c are sequentially disposed.

Here, spaces between the plurality of display modules 1000a, 1000b, and 1000c may be determined by the user or may be determined according to controlling of the controller 180.

In the present disclosure, as illustrated in (a) of FIG. 5A and (b) of FIG. 5B, the state in which spaces between the plurality of display modules 1000a, 1000b, and 1000c have a predetermined size may be referred to as a "transparent mode". The display device 100 according to the present disclosure may provide both daylighting and visual information in the transparent mode.

Also, as illustrated in (b) of FIG. 5A, the plurality of display modules 1000a, 1000b, and 1000c may be disposed to be adjacent to each other such that spaces therebetween are not formed. In this manner, the state in which the plurality of display modules 1000a, 1000b, and 1000c are disposed such that spaces therebetween are not formed may be referred to as an "advertisement display mode". In this present disclosure, in the advertise display mode, visual information may be displayed as a general display unit does, although a daylighting effect is not provided.

Meanwhile, the visual information may be displayed on a side surface of the plurality of display modules 1000a, 1000b, and 1000c.

For example, as illustrated in (a) and (b) of FIG. 5C, the plurality of display modules 1000a, 1000b, and 1000c may rotate at 90 degrees with respect to the rotational axis A-A' such that side surfaces of the plurality of display modules 1000a, 1000b, and 1000c are disposed in a forward direction. In this case, the controller 180 may control the plurality of display modules 1000a, 1000b, and 1000c such that visual information is displayed on the side surface thereof through LED devices disposed on the side surfaces of the plurality of display modules 1000a, 1000b, and 1000c.

Here, as illustrated in (b) of FIG. 5C, a state in which visual information is displayed on the side surface of each of the plurality of display modules 1000a, 1000b, and 1000c and a predetermined space is formed between the plurality of display modules 1000a, 1000b, and 1000c may be referred to as a "stretch transparent mode". Also, as illustrated in (c) of FIG. 5C, a state in which visual information is displayed on the side surface of each of the plurality of display modules 1000a, 1000b, and 1000c and a space is not formed between the plurality of display modules 1000a, 1000b, and 1000c may be referred to as a "stretch mode".

As discussed above, the display device 100 according to the present disclosure may be defined in various modes depending on spaces between the plurality of display modules. Hereinafter, a method for displaying visual information in each mode will be described in detail.

FIGS. 6A to 6D are conceptual views illustrating a state in which visual information is displayed according to each mode in a display device according to the present disclosure.

The controller 180 may display visual information in various manner in various states of the plurality of display modules described above.

Figure 6A:
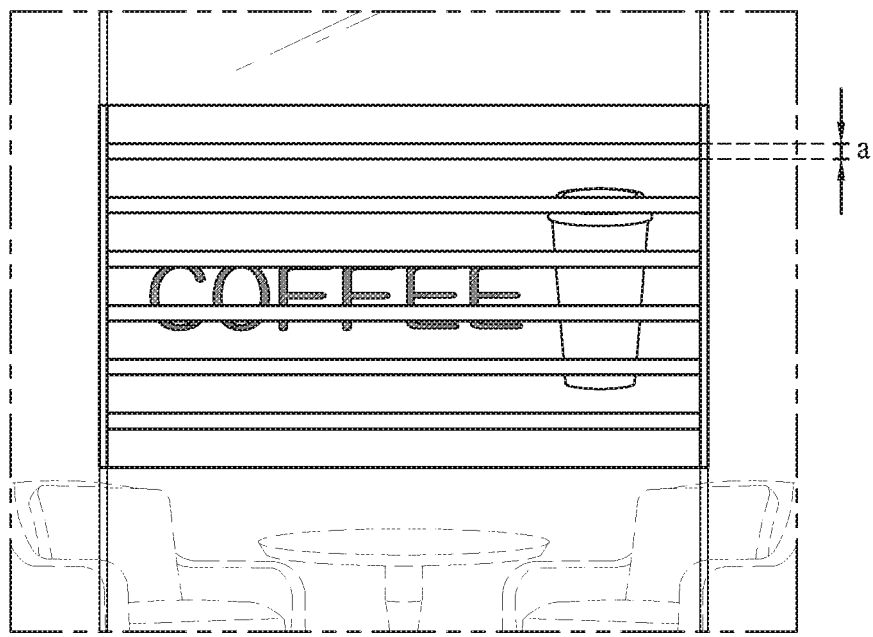
FIGS. 6A to 6D are conceptual views illustrating a state in which visual information is displayed according to each mode in a display device according to the present disclosure.

For example, as illustrated in FIG. 6A, the controller 180 may display visual information in the "transparent mode" in which the plurality of display modules are disposed at a predetermined space (a).

Here, the visual information may include advertisement information formed of at least one of an image and text. Also, the visual information may include a still image and video.

In this case, in the display device 100 according to the present disclosure, light may be allowed to pass through the spaces between the plurality of display modules and visual information displayed on the plurality of display modules may be provided. That is, the display device 100 according to the present disclosure may obtain both a daylighting effect and an advertisement effect.

Figure 6B:
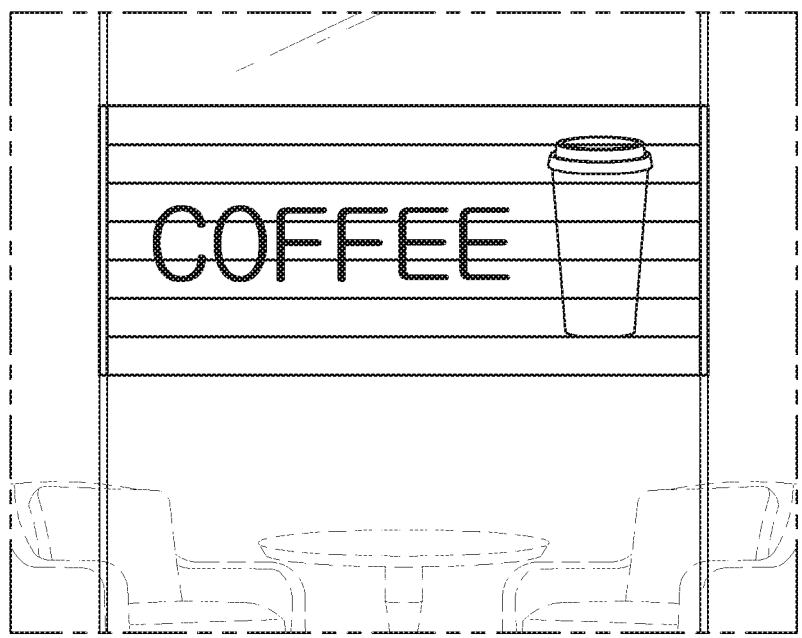

In another example, as illustrated in FIG. 6B, the controller 180 may display visual information on a front surface in an "advertisement display mode" in which the plurality of display modules are disposed without a space therebetween.

In this case, in the display device 100, since spaces are not formed between the plurality of display modules, light may not pass through between the plurality of display modules. That is, the plurality of display modules may serve to block light. Also, without spaces between the plurality of display modules, the display device 100 may have a display effect of visual information like an existing display unit.

Figure 6C:
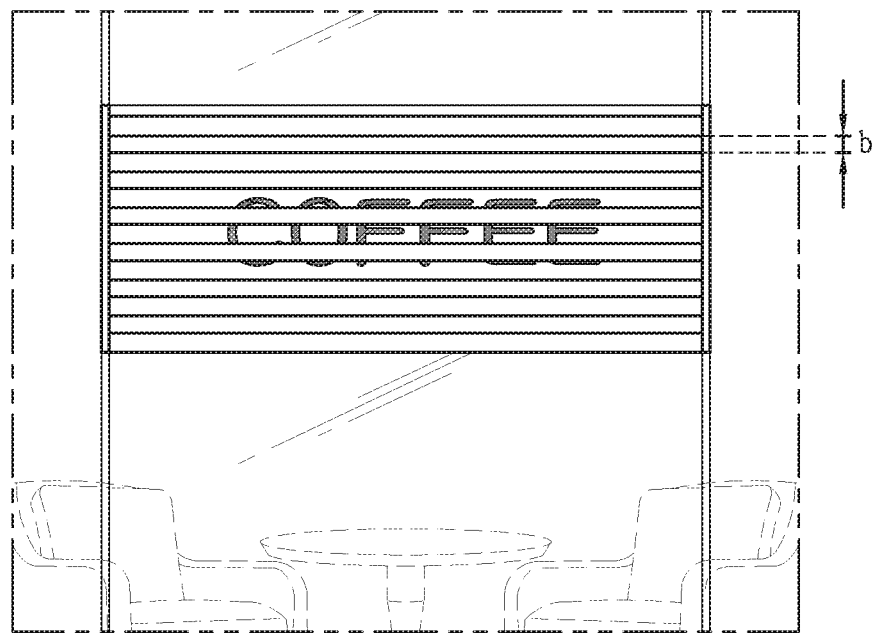

In another example, as illustrated in FIG. 6C, the controller 180 may output visual information on a side surface in the "stretch transparent mode" in which a predetermined space (b) is formed between the plurality of display modules.

Unlike the "transparent mode", visual information is displayed on the side surface of the display module in the "stretch transparent mode", an area for displaying visual information may be narrowed. That is, in the "stretch transparent mode", a display region extending in one direction may be provided. Thus, in the "stretch transparent mode", information that may be displayed in one direction such as text information may be displayed. For example, as illustrated in FIG. 6C, text of "coffee" may be displayed. Here, also in the "stretch transparent mode", a daylighting effect may be provided through the spaces between the display modules, as well as displaying visual information.

Figure 6D:
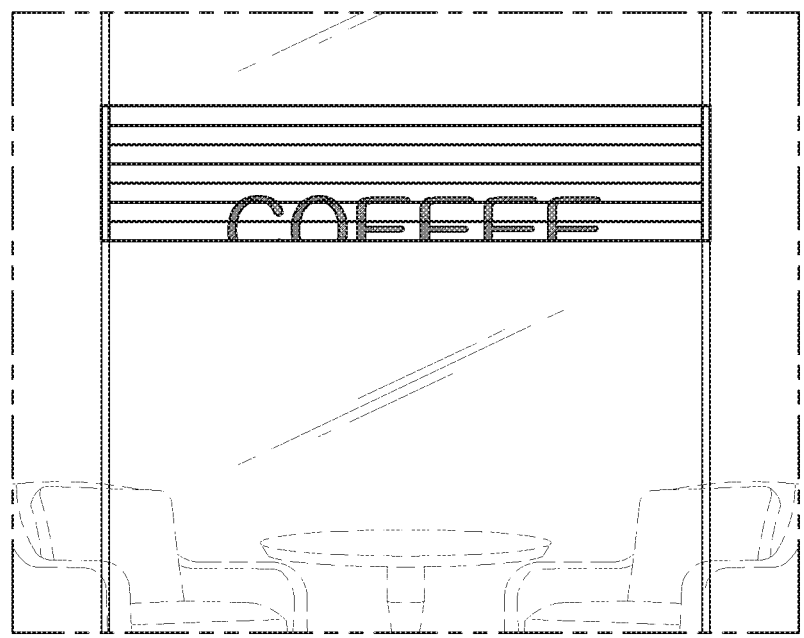

In another example, as illustrated in FIG. 6D, in the "stretch mode" in which a space is not formed between the plurality of display modules, visual information may be output on the side surface of the display unit 151. In this case, like the "stretch transparent mode", the display unit 151 may have an extending display region. Thus, even in the "stretch mode", text information that may be displayed to extend in one direction may be output.

In the above, the output form of visual information according to states of the plurality of display modules has been described. In the present disclosure, by forming the plurality of display modules such that they are relatively moved, visual information may be provided, as well as providing an appropriate daylighting effect.

Figure 7:
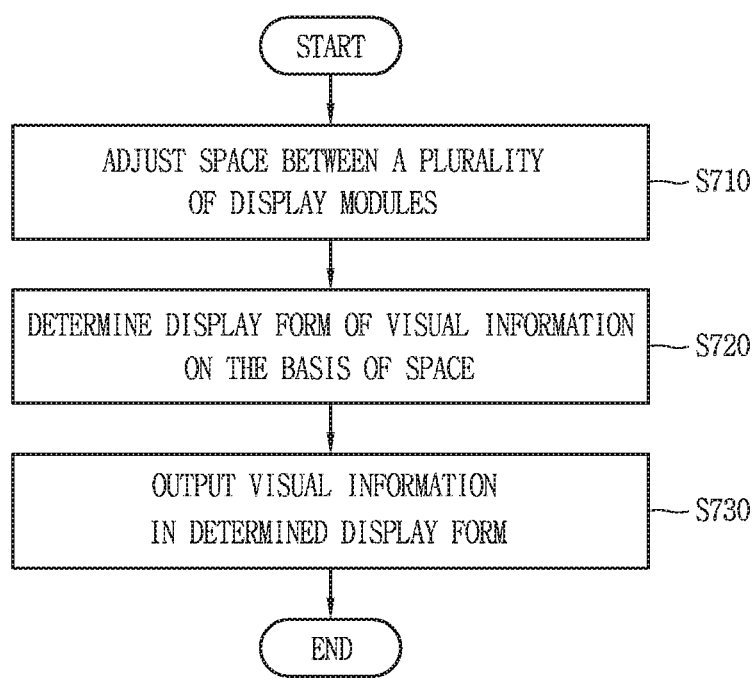
FIG. 7 is a flow chart illustrating a method for displaying visual information according to a space of a display unit in a display device according to the present disclosure.
Figure 8A:
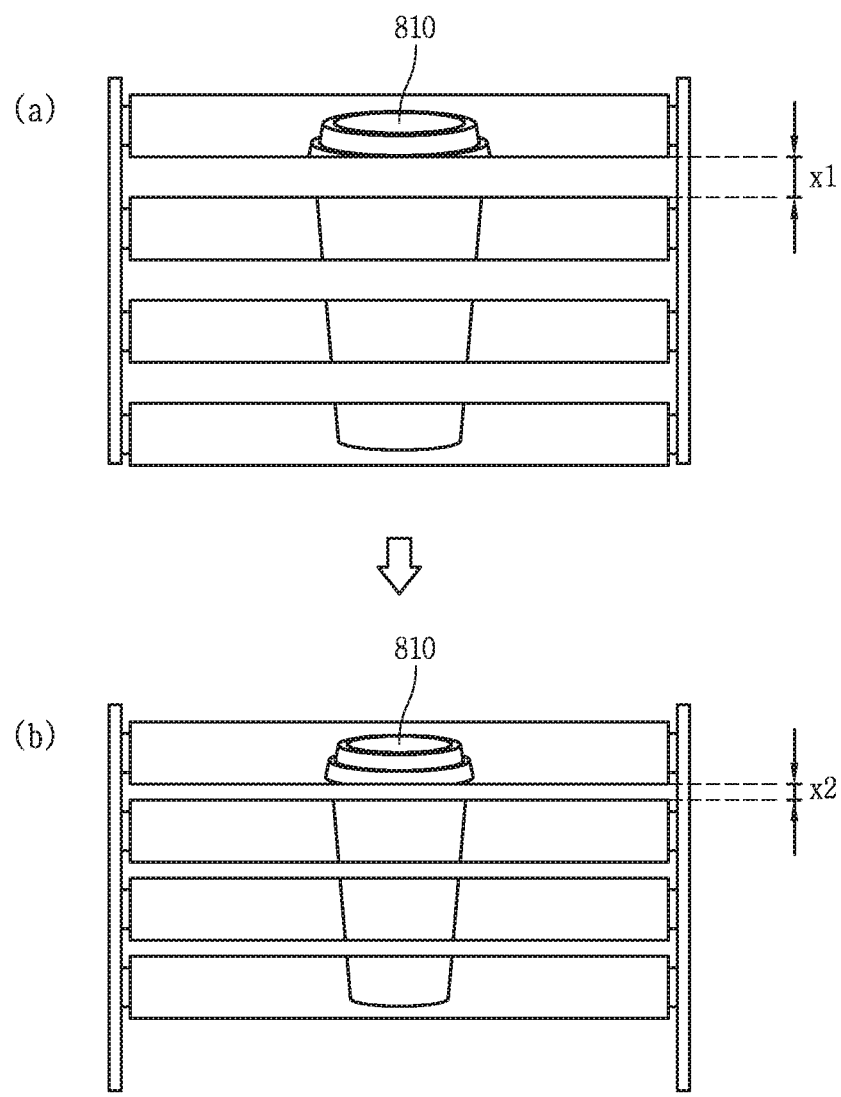
FIGS. 8A to 8C are conceptual views illustrating the control method of FIG. 7.
Figure 8B:
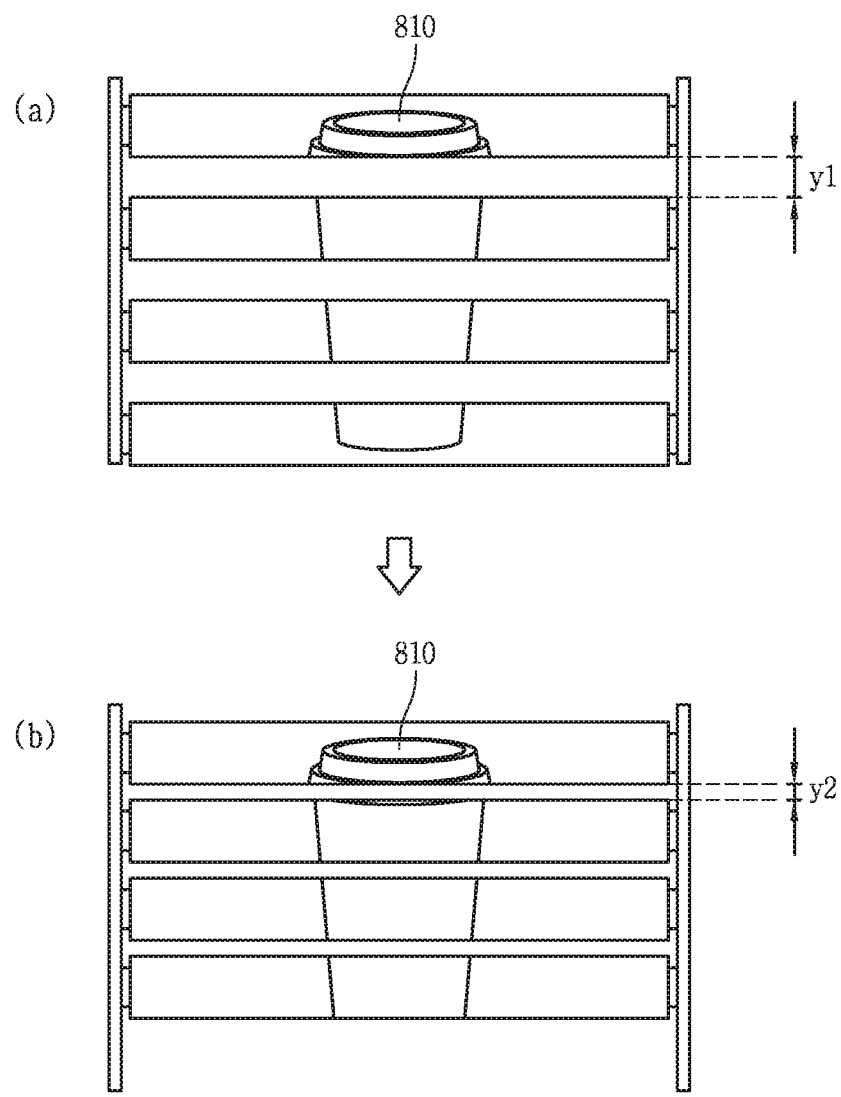
Figure 8C:
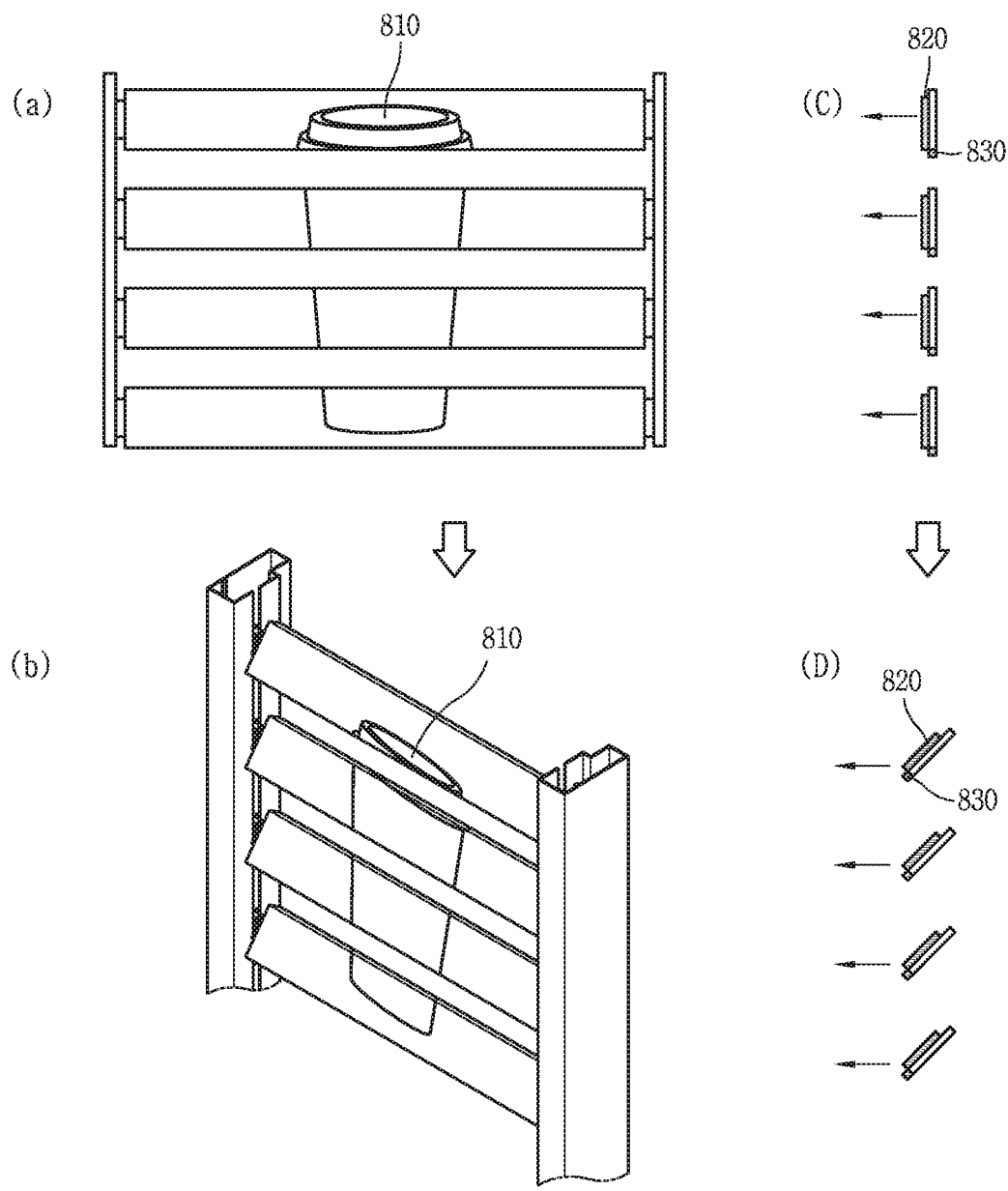

Hereinafter, a method for displaying visual information according to a space of the display unit 151 of the display device 100 according to the present disclosure will be described. FIG. 7 is a flow chart illustrating a method for displaying visual information according to a space of the display unit 151 in a display device according to the present disclosure, and FIGS. 8A to 8C are conceptual views illustrating the control method of FIG. 7.

The display device 100 according to the present disclosure may include the display unit 151 including a plurality of display modules. As described above, the plurality of display modules may be relatively moved, whereby a space may be formed between the plurality of display modules.

The controller 180 may control the plurality of display modules such that visual information appropriate for a space between the plurality of display modules may be displayed.

First, the controller 180 may adjust a space between the plurality of display modules (S710).

The controller 180 may adjust a space between the plurality of display modules on the basis of a user's control command or a preset condition.

Here, the user's control command may include a software input such as a gesture input, a button input, and the like, or a physical input such as an external force directly applied to the connection unit. For example, the controller 180 may sense a user's gesture through a camera provided in the display device 100, and may adjust a space between the plurality of display modules on the basis of the user's gesture. In another example, in order to adjust a space between the plurality of display modules, the user may directly apply a force to the connection unit. In this case, the plurality of display modules may be relatively moved according to a magnitude of the force, and the controller 180 may measure the space between the plurality of display modules formed according to the relative movement.

The preset condition may be a condition related to at least one of time and an ambient intensity of illumination. For example, when an ambient intensity of illumination is a first intensity of illumination, the controller 180 may relatively move the plurality of display modules to have a first space. In another example, the controller 180 may relatively move the plurality of display modules according to a present time.

Meanwhile, a space between the plurality of display modules may be changed at every preset time. For example, the controller 180 may alternately change a space between the plurality of display modules from a first space to a second space at every time period. That is, the controller 180 may actively change the space between the display modules.

After adjusting the space between the plurality of display modules, the controller 180 may determine a display form of visual information (S720).

A display form of visual information may be at least one of a display size and a display position. In detail, the display size refers to a size in which the visual information is displayed on the display unit 151, and the display position refers to a position in which the visual information is displayed on the display unit 151. For example, the display position may be at least one position of the front surface and the side surface of the display module.

For example, when the plurality of display modules has the first space therebetween, the controller 180 may display visual information by a first display size in a first position. In another example, when the plurality of display modules has a second space therebewteen, the controller 180 may display visual information by a second display size in a second position.

When the display form is determined, the controller 180 may display visual information in the determined display form (S730).

The controller 180 may output visual information in the determined display form by a space between the plurality of display modules. Thus, the controller 180 may output visual information in a form most appropriate for a space between the plurality of display modules.

Hereinafter, an example in which a display form of visual information is determined according to a space between the plurality of display modules will be described.

The controller 180 may determine a display size of visual information on the basis of a space between the plurality of display modules.

For example, referring to (a) of FIG. 8A, when the plurality of display modules has a first space x1 therebetween, the controller 180 may display visual information 810 by a first size.

Here, the controller 180 may sense that the space between the plurality of display modules is changed. For example, the space between the plurality of display modules may be changed from the first space x1 to a second space x2.

In this case, as illustrated in (b) of FIG. 8A, the controller 180 may change the display size of the visual information 810 to a second size corresponding to the second space x2.

Also, the controller 180 may determine a degree of output of the visual information on the basis of a space between the plurality of display modules. The degree of output may refer to a ratio of a region actually output on the plurality of display modules to the entire output region of visual information.

For example, as illustrated in (a) of FIG. 8B, when a space between the plurality of display modules has a first space y1 therebetween, the controller 180 may output the entire output region of the visual information 810.

However, as illustrated in (b) of FIG. 8B, when the space between the plurality of display modules is changed from the first space y1 to a second space y2, the controller 180 may output only a partial output region of the visual information 810 and limit output of the other remaining output region.

That is, the controller 180 may control a degree of output of visual information according to an output size of the display unit 151 formed by the plurality of display modules, without changing a display size of the visual information.

Meanwhile, the controller 180 may select a region in which output is limited and a region to be output on the basis of image analysis information. For example, the controller 180 may output a region determined to include important information and limit output of a remaining region. A region determined to include important information may be a region including a largest graphic object, or a central region of an image may be selected.

Also, the controller 180 may determine an output position of visual information on the basis of a rotation angle of the plurality of display modules. In detail, the controller 180 may output visual information such that the visual information is seen to a user in a direction in which the plurality of display modules faces forwardly. To this end, when the plurality of display modules rotate at a predetermined angle, the controller 180 may display visual information in at least a portion of the front surface and the rear surface of each of the display modules.

For example, referring to (a) and (b) of FIG. 8C, in a state in which the plurality of display modules are not rotated, visual information may be displayed on a front surface 820 of the plurality of display modules.

Here, the controller 180 may sense rotation of the plurality of display modules. For example, referring to (b) and (d) of FIG. 8C, the plurality of display modules may rotate at a predetermined angle.

In this case, on the basis of a rotation angle of the plurality of display modules, the controller 180 may control each of the display modules to display at least a portion of the visual information, which is being displayed on the front surface 820, on a side surface 830. That is, as illustrated in (b) and (d) of FIG. 8C, the controller 180 may perform controlling to display the visual information in a portion of the front surface 820 and in a portion of the side surface 830 of the display modules.

Or, although not shown, when the plurality of display modules rotate at an angle smaller than a preset rotation angle, the controller 180 may output the visual information on the region of the front surface 820, and when the plurality of display modules rotate at an angle greater than the preset rotation angle, the controller 180 may output the visual information on the region of the side surface 830.

That is, in order to solve the problem that visual information displayed in one region of the front surface due to rotation of the display modules, the controller 180 may change an output position of the visual information in the front surface region and display a portion of the visual information on the side surface region. Thus, the display device 100 according to the present disclosure may prevent a degradation of visibility of visual information according to rotation of the display modules.

In the above, the method for displaying visual information according to a space between the display modules has been described.

Figure 9:
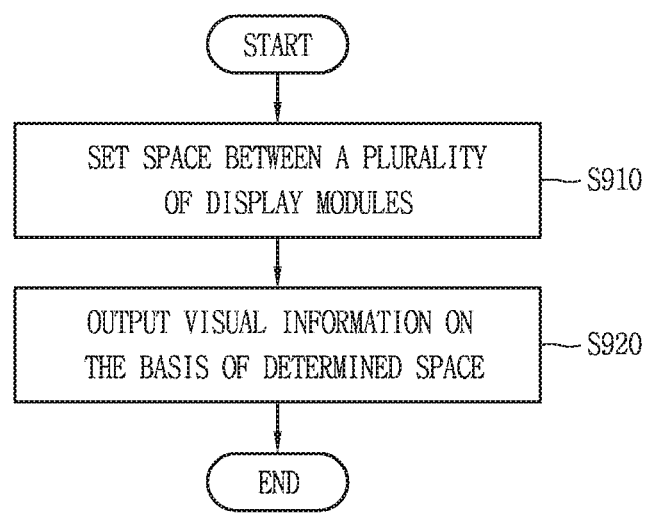
FIG. 9 is a flow chart illustrating a method for providing different types of visual information according to a space between display modules.
Figure 10:
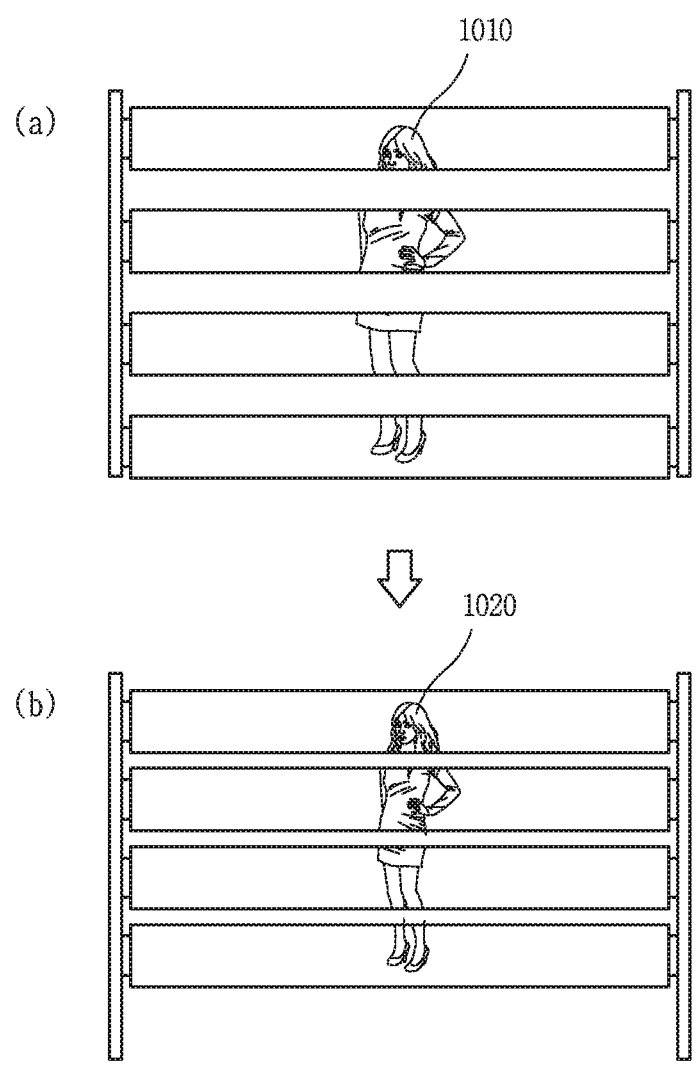
FIG. 10 is a conceptual view illustrating an embodiment of FIG. 9.

Hereinafter, a method for providing different visual information according to a space between display modules will be described. FIG. 9 is a flow chart illustrating a method for providing different types of visual information according to a space between display modules, and FIG. 10 is a conceptual view illustrating an embodiment of FIG. 9.

Referring to FIG. 9, the controller 180 may determine a space between a plurality of display modules (S910).

The space between the plurality of display modules may be determined according to a user's control command or a preset condition as described above with reference to FIG. 7.

When the space between the plurality of display modules is determined, the controller 180 may output different visual information on the basis of the set space (S920).

The controller 180 may output different visual information on the basis of the space between the plurality of display modules.

For example, as illustrated in (a) of FIG. 10, when a space between the plurality of display modules is a first space, the controller 180 may output first visual information 1010.

Here, the controller 180 may sense that the space between the plurality of display modules is changed from the first space to a second space. In this case, as illustrated in (b) of FIG. 10, the controller 180 may output second visual information 1020, instead of the first visual information 1010.

Meanwhile, in a case in which a space between the plurality of display modules is automatically changed at every preset time period, the controller 180 may automatically change visual information displayed at each period. That is, the controller 180 may change and output visual information together on the basis of a change in a space between the plurality of display modules.

In the above, the method for displaying different visual information according to a space between the plurality of display modules has been described. Thus, the display device 100 according to the present disclosure may provide visual information suiting a space between the plurality of display modules in an appropriate form.

Figure 11:
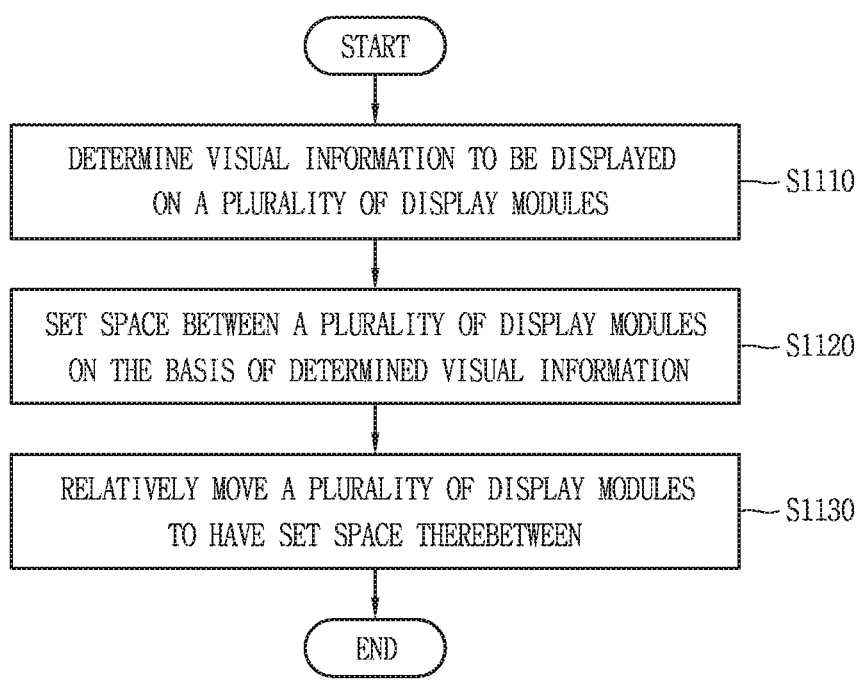
FIG. 11 is a flow chart illustrating a method for adjusting a space between a plurality of display modules on the basis of visual information.
Figure 12:
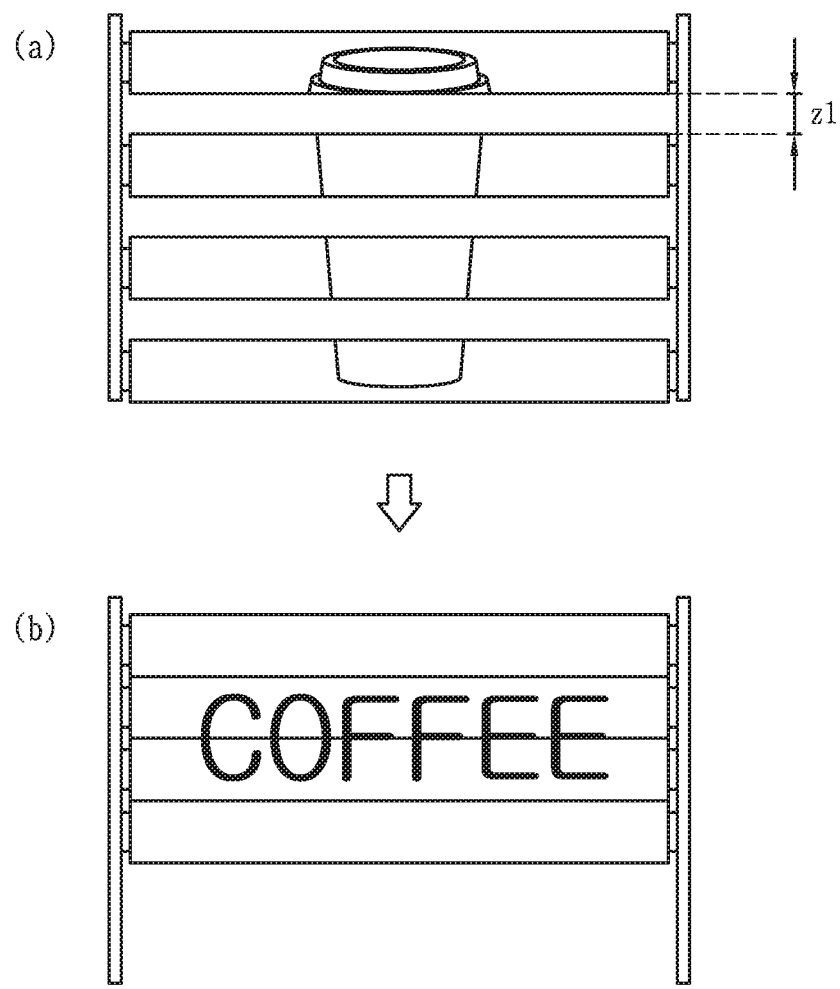
FIG. 12 is a conceptual view illustrating an embodiment of FIG. 11.

Hereinafter, a method for adjusting a space between a plurality of display modules on the basis of visual information will be described. FIG. 11 is a flow chart illustrating a method for adjusting a space between a plurality of display modules on the basis of visual information, and FIG. 12 is a conceptual view illustrating an embodiment of FIG. 11.

First, referring to FIG. 11, the controller 180 may determine visual information to be displayed on the plurality of display modules (S1110).

The controller 180 may determine visual information to be displayed on the plurality of display modules on the basis of a user's control command. The visual information may include a still image, video, text, and the like.

Next, the controller 180 may set a space between the plurality of display modules on the basis of the determined visual information (S1120).

The controller 180 may set a space between the plurality of display modules on the basis of an attribute of the visual information. The attribute of the visual information may include a display size of the visual information and a type of the visual information. The display size of the visual information may refer to a display size according to resolution of the visual information. Also, the type of the visual information may refer to a type such as an image, text, a figure, video, and the like.

For example, in case of visual information having high resolution, since a display size is large, the controller 180 may widen a space between the plurality of display modules, and in case of visual information having low resolution, since a display size is small, the controller 180 may narrow a space between the plurality of display modules.

In another example, as illustrated in (a) of FIG. 12, when visual information to be displayed on the plurality of display modules is an image, the controller 180 may set a space between the plurality of display modules to a first space z1. Also, as illustrated in (b) of FIG. 12, when visual information to be displayed on the plurality of display modules is text, the controller 180 may set a space between the plurality of display modules to 0.

That is, the controller 180 may control the plurality of display modules to have an appropriate space therebetween on the basis of an attribute of visual information.

When a space between the plurality of display modules is set, the controller 180 may relatively move the plurality of display modules (S1130).

That is, the controller 180 may appropriately adjust a space between the plurality of display modules.

Meanwhile, although not shown, in a case in which a first image and a second image are sequentially output, the controller 180 may control the plurality of display modules to change a space therebetween, as well as changing from the first image to the second image.

In the above, the method for controlling a space between the plurality of display modules on the basis of an attribute of visual information.

Hereinafter, various display structures including a plurality of display modules in the display device 100 according to the present disclosure will be described. FIGS. 13 to 16 are conceptual views illustrating various display structures including a plurality of display modules.

The plurality of display modules according to the present disclosure may have a bar shape. Thus, each of the plurality of display modules according to the present disclosure may be coupled in various forms.

Figure 13:
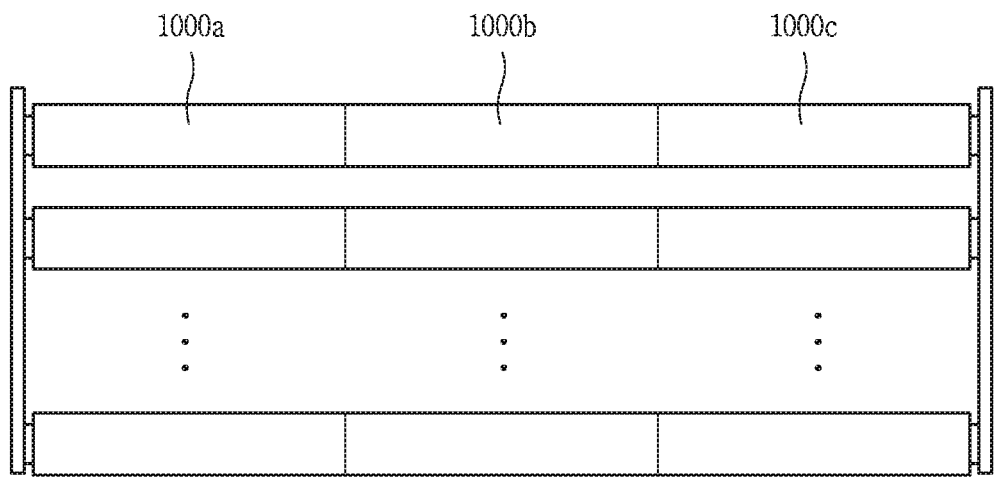
FIGS. 13 to 16 are conceptual views illustrating various display structures including a plurality of display modules.

For example, as illustrated in FIG. 13, the plurality of display modules 1000a, 1000b, and 1000c may be coupled in one direction to extend in one direction. That is, two or more display modules may be coupled to form a single integrated module.

In this case, in the display device 100, a single display unit 151 may be formed by sequentially disposing a plurality of integrated modules in one direction.

Figure 14:
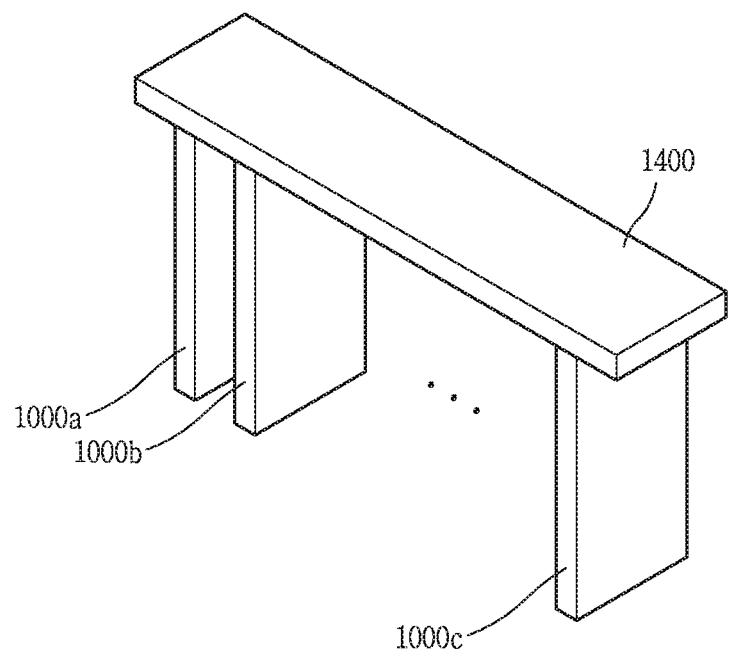

In another example, as illustrated in FIG. 14, the display modules 1000a, 1000b, and 1000c may be fixed to a single frame 1400 and disposed in one direction. In this case, the single frame 1400 may be formed to be fixed to a wall (or a ceiling), and each of the display modules 1000a, 1000b, and 1000c may be coupled and fixed to the single frame 1400. In this case, the display modules 1000a, 1000b, and 1000c may be moved in a horizontal direction, rather than in a vertical direction, such that a space therebetween is controlled.

Figure 15:
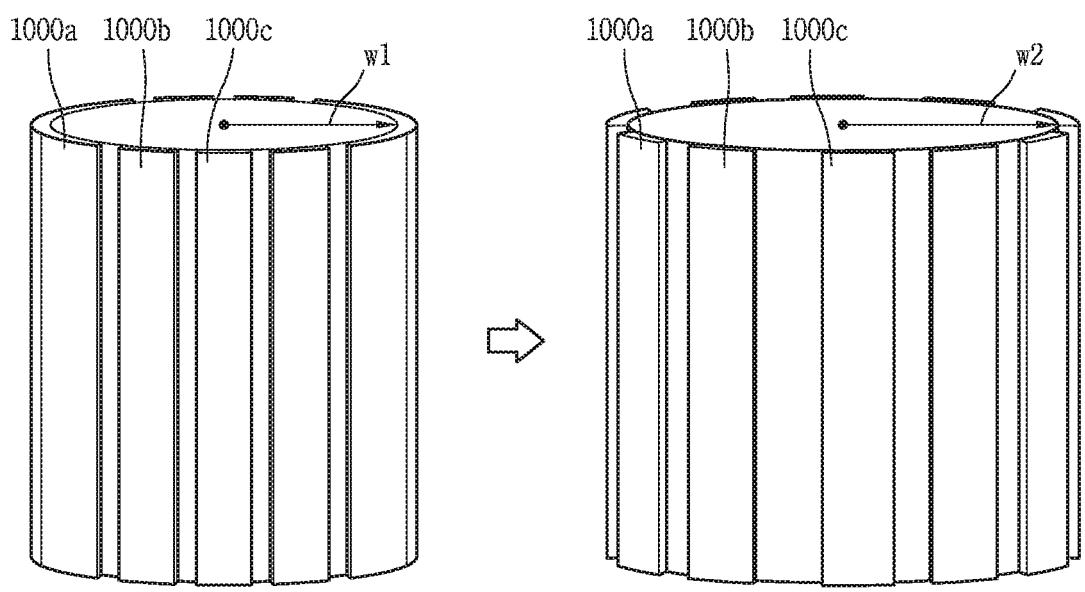

In another example, as illustrated in FIG. 15, the plurality of display modules 1000a, 1000b, and 1000c may be coupled to form a cylinder. In this case, a diameter of the cylinder may be increased or decreased by controlling a space between the plurality of display modules 1000a, 1000b, and 1000c. For example, as illustrated in FIG. 15, when a space between the plurality of display modules 1000a, 1000b, and 1000c is increased, a radius of the cylinder may be increased from w1 to w2. That is, the display unit 151 of the display device 100 may be changed in volume.

Figure 16:
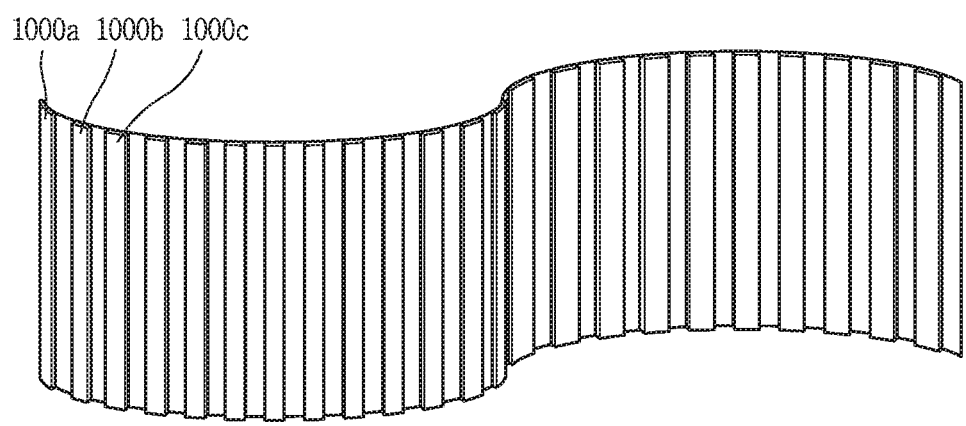

In another example, as illustrated in FIG. 16, the plurality of display modules 1000a, 1000b, and 1000c may be coupled to form a curved surface. That is, when a frame coupled to the plurality of display modules 1000a, 1000b, and 1000c is formed to be curved, each of the display modules 1000a, 1000b, and 1000c may form a curved surface. That is, in the present disclosure, by forming the single display unit 151 by coupling the plurality of display modules 1000a, 1000b, and 1000c, a limitation of the display unit 151 in form may be overcome.

In the display device according to the present disclosure, since the plurality of display modules are relatively moved through the connection unit, light may be allowed to pass through the spaces between the plurality of display modules, as well as outputting visual information. Thus, the present disclosure may provide both a daylighting effect and an advertisement effect utilizing visual information.

Also, in the display device according to the present disclosure, since the plurality of display modules are relatively moved through the connection unit, a form of the display device may be varied. Thus, the present disclosure may provide a dynamic display device having a new structure.

In addition, in the display device according to the present disclosure, since a display form of visual information is controlled according to spaces between the plurality of display modules, appropriate visual information may be provided on the varied display device. Thus, the present disclosure may provide visual information in an appropriate form on the varied display device.

Moreover, in the display device according to the present disclosure, since the plurality of display modules are coupled in various forms, various types of display devices may be provided.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

What is claimed is:

1. A display device comprising:
a plurality of display modules configured to output visual information, each of the plurality of display modules having a bar shape and sequentially disposed in one direction;
a connection unit connecting the plurality of display modules such that each of the plurality of display modules is movable relative to another one of the plurality of display modules; and
a controller configured to:
control the connection unit to cause the plurality of display modules to adjust daylighting using a space formed between the plurality of display modules;
cause the plurality of display modules to move automatically periodically such that the space is changed alternately between a first space and a second space; and
cause the plurality of display modules to automatically output different types of visual information alternately such that first type of visual information is displayed when the space corresponds to the first space and second type of visual information is displayed when the space corresponds to the second space.

2. The display device of claim 1, wherein the controller controls the connection unit such that the plurality of display modules have a predetermined space therebetween on the basis of a user's control command.

3. The display device of claim 1, wherein the controller determines a display size of the different types of visual information on the basis of the space formed between the plurality of display modules.

4. The display device of claim 1, wherein when the space formed between the plurality of display modules corresponds to a preset space, the controller limits outputting of at least a portion of particular visual information.

5. The display device of claim 4, wherein when the outputting of at least the portion of the particular visual information is limited, the controller outputs a remaining portion of the particular visual information on the plurality of display modules.

6. The display device of claim 1, wherein:
a size of the space formed between the plurality of display modules is adjustable; and
the controller further outputs the different types of visual information on the basis of the size of the space formed between the plurality of display modules.

7. The display device of claim 1, wherein:
the first space is greater than the second space;
the first type of visual information comprises an image; and
the second type of visual information comprises text.

8. The display device of claim 1, wherein the controller is further configured to determine an output position of the different types of visual information on the basis of a rotation angle at which the plurality of display modules are rotated with respect to a preset reference axis.

9. The display device of claim 8, wherein:
each of the plurality of display modules has a front surface and a side surface;
each of the front surface and the side surface is configured to output particular visual information;
when the plurality of display modules rotate at a first angle smaller than a preset rotation angle, the controller outputs the particular visual information on the front surface region; and
when the plurality of display modules rotate at a second angle greater than the preset rotation angle, the controller outputs the particular visual information on the side surface region.

10. The display device of claim 1, wherein the controller is further configured to set the space formed between the plurality of display modules on the basis of the different types of visual information and relatively moves the plurality of display modules to have a preset space therebetween.

11. A method for controlling a display device having a plurality of display modules, wherein each of the plurality of display modules has a bar shape and sequentially disposed in one direction, the method comprising:
cause the plurality of display modules to adjust daylighting using a space formed between the plurality of display modules,
wherein the plurality of display modules are connected by a connection unit such that each of the plurality of display modules is movable relative to another one of the plurality of display modules;
automatically moving the plurality of display modules periodically such that the space is changed alternately between a first space and a second space; and
causing the plurality of display modules to automatically output different types of visual information alternately such that first type of visual information is displayed when the space corresponds to the first space and second type of visual information is displayed when the space corresponds to the second space.

12. The method of claim 11, wherein:
a size of the space formed between the plurality of display modules is adjustable; and
the method further comprises outputting the different types of visual information on the basis of the size of the space formed between the plurality of display modules.

13. The method of claim 11, wherein:
the first space is greater than the second space;
the first type of visual information comprises an image; and
the second type of visual information comprises text.

14. The method of claim 11, further comprising determining an output position of the different types of visual information on the basis of a rotation angle at which the plurality of display modules are rotated with respect to a preset reference axis.

15. The method of claim 14, wherein:
each of the plurality of display modules has a front surface and a side surface; and
the method further comprises:
outputting particular visual information on each of the front surface and the side surface;
when the plurality of display modules rotate at a first angle smaller than a preset rotation angle, outputting the particular visual information on the front surface region; and
when the plurality of display modules rotate at a second angle greater than the preset rotation angle, outputting the particular visual information on the side surface region.

* * * * *